US011651462B2

(12) United States Patent
Tsung et al.

(10) Patent No.: US 11,651,462 B2
(45) Date of Patent: May 16, 2023

(54) METHODS AND SYSTEMS FOR DETECTING TRANSACTION LAUNDERING

(71) Applicant: Visa International Service Association, San Francisco, CA (US)

(72) Inventors: Michael Hsiang Tsung, Lafayette, CA (US); Tselmeg Otgonbayar Shponko, San Francisco, CA (US); Ratinder Bedi, San Ramon, CA (US); Girish Ramachandran, Milpitas, CA (US); Martin Charles Elliott, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 588 days.

(21) Appl. No.: 16/736,668

(22) Filed: Jan. 7, 2020

(65) Prior Publication Data
US 2021/0209613 A1    Jul. 8, 2021

(51) Int. Cl.
*G06N 20/00*      (2019.01)
*G06Q 50/26*      (2012.01)
(Continued)

(52) U.S. Cl.
CPC ....... *G06Q 30/0185* (2013.01); *G06F 18/214* (2023.01); *G06F 18/24147* (2023.01); *G06F 18/24323* (2023.01); *G06N 20/00* (2019.01); *G06N 20/20* (2019.01); *G06Q 20/4016* (2013.01); *G06Q 30/018* (2013.01); *G06Q 50/265* (2013.01)

(58) Field of Classification Search
CPC ........... G06Q 30/0185; G06Q 20/4016; G06Q 30/018; G06Q 50/265; G06N 20/20; G06N 20/00; G06N 5/003; G06K 9/6256; G06K 9/6276; G06K 9/6282; G06F 18/24323; G06F 18/24147; G06F 18/214
See application file for complete search history.

(56) References Cited

U.S. PATENT DOCUMENTS 11,119,630 B1 * 9/2021 Marchetti ................ G06N 5/04
2015/0278817 A1 * 10/2015 Abifaker ............ G06Q 20/4016
705/44

(Continued)

*Primary Examiner* — Kenny A Cese
(74) *Attorney, Agent, or Firm* — Schwabe, Williamson & Wyatt, PC (57) ABSTRACT

Methods and systems are described. A method includes accessing training data samples that includes a plurality of transaction laundering associated features and generating random samples, training a first plurality of different models to identify transaction laundering merchants based on random samples generated from each of the training data samples, training a second plurality of different models to identify the transaction laundering merchants based on the training data, generating a transaction laundering classification for a merchant from each of the first plurality of models and each of the second plurality of models, generating a first model group classification based on a first majority vote on transaction laundering classifications from the first plurality of models, and generating a second model group classification based on a second majority vote on transaction laundering classifications from the second plurality of models. A likelihood that the merchant is a transaction launderer is determined.

17 Claims, 7 Drawing Sheets

(51) Int. Cl.
*G06Q 20/40* (2012.01)
*G06N 20/20* (2019.01)
*G06Q 30/018* (2023.01)
*G06F 18/214* (2023.01)
*G06F 18/2413* (2023.01)
*G06F 18/243* (2023.01)

(56) References Cited

U.S. PATENT DOCUMENTS

2019/0065939 A1* 2/2019 Bourgoin .................. G06N 3/08
2020/0065813 A1* 2/2020 Walters .................. G06N 3/084
2020/0234305 A1* 7/2020 Knutsson .............. G06F 17/153

* cited by examiner

METHODS AND SYSTEMS FOR DETECTING TRANSACTION LAUNDERING

TECHNICAL FIELD

Embodiments of the disclosure pertain to transaction laundering and, in particular, the detection of transaction laundering.

TECHNOLOGY BACKGROUND

Transaction laundering occurs when businesses use legitimate or fabricated merchant accounts to process unauthorized, illegal or prohibited card transactions. Transaction laundering allows sellers of illicit goods and services to hide the true source of the transaction by layering it through a fictitious low risk merchant account(s). An example is a merchant account set up as an online jewelry store that facilitates transactions from illegal gambling or drug sales.

The exponential growth of online commerce, internet anonymity and the ease at which merchant accounts can be activated via third-parties, has led to a worldwide upsurge in the use of transaction laundering that currently presents a heightened risk to the payment ecosystem. It is a particularly difficult problem for merchant acquirers to detect and mitigate due to falsified applications that include deceptive information such as mockup websites that appear legitimate, hired shell owners or directors with clean background records and bogus addresses. The major business enterprises utilizing transaction laundering hide the sales of counterfeit products, illegal drugs, unlawful gambling operators and unapproved prescription pharmaceuticals.

Even when goods or services are sold legally, if such sales are misrepresented, they can violate the internal rules of a payment network or financial institution. Most illegal gambling sites use transaction laundering to intentionally miscode or misidentify transactions in order to mislead issuers to approve transactions they would otherwise decline. As such, payment system participants who are unable to appropriately detect transaction laundering face a high risk of regulatory fines and law enforcement action.

DESCRIPTION OF THE EMBODIMENTS

The embodiments described herein are not intended to be limited to the specific forms set forth herein. The embodiments are intended to cover such alternatives, modifications, and equivalents that are within the scope of the appended claims.

The detailed description that follows includes numerous specific details such as specific method orders, configurations, structures, elements, and connections have been set forth. It is to be understood however that these and other specific details need not be utilized to practice embodiments. In other embodiments, well-known structures, elements, or connections have been omitted, or have not been described in a manner so as not to obscure this description.

Any reference within the specification to "one embodiment" or "an embodiment" is intended to indicate that a particular feature, configuration, structure, or characteristic described in connection with the embodiment is included in at least one embodiment of the present invention. The appearance of the phrase "in one embodiment" in different parts of the specification can refer to different embodiments. Embodiments described as separate or alternative embodiments are not mutually exclusive of other embodiments. Moreover, various features are described which may be included in some embodiments and not by others. In addition, some requirements for some embodiments may not be required for other embodiments.

In the following description, unless indicated otherwise terms such as "accessing" or "determining" or "training" or "generating" or the like, refer to the operations and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Network Architecture

Figure 1A:
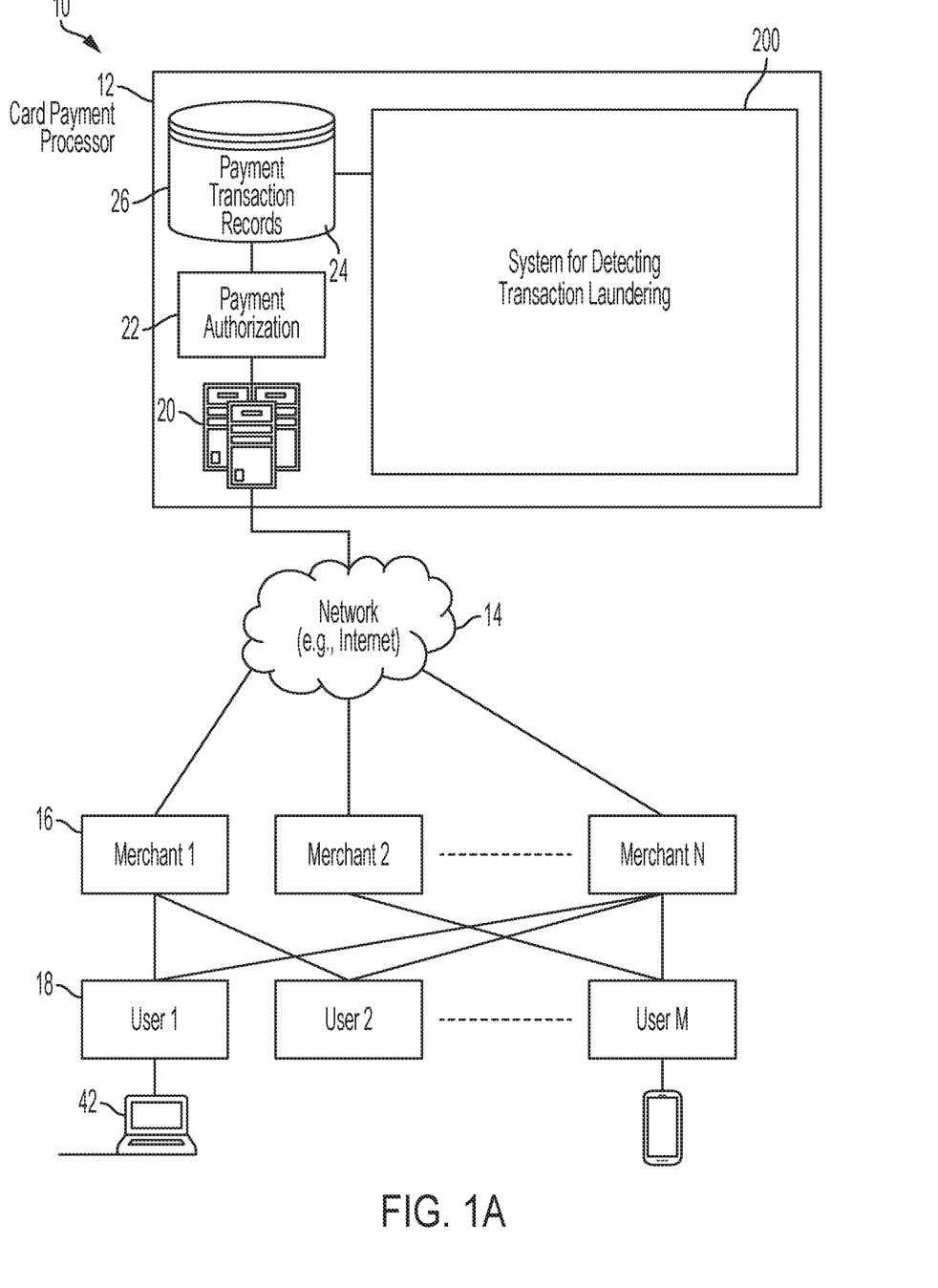
FIG. 1A shows a diagram of a card payment processing network architecture according to an embodiment.

FIG. 1A is a diagram of one embodiment of a card payment processing system in which the disclosed embodiments may be implemented. The card payment processing system 10 includes a card payment processor 12 in communication (direct or indirect) over a network 14 with a plurality of merchants 16. A plurality of cardholders or users 18 purchase goods and/or services from various ones of the merchants 16 using a payment card such as a credit card, debit card, prepaid card and the like. Typically, the card payment processor 12 provides the merchants 16 with a servicer or device that allows the merchants to accept payment cards as well as to send payment details to the card payment processor over the network 14. In some embodiments, an acquiring bank or processor (not shown) may forward the credit card details to the card payment processor 12. Payment card transactions may be performed using a variety of platforms such as brick and mortar stores, ecommerce stores, wireless terminals, and mobile devices of the users. The payment card transaction details sent over the network 14 are received by one or more servers 20 of the card payment processor 12 and processed by, for example, a payment authorization process 22 and/or forwarded to an issuing bank (not shown). The payment card transaction details are stored as payment transaction records 24 in a transaction database 26. As is well known the servers 20 include memory and processors for executing software components as described herein.

The most basic and common type of payment card transaction data is referred to as a level 1 transaction. The basic data fields of a level 1 payment card transaction are: i) merchant name, ii) billing zip code, and iii) transaction amount. Additional information, such as the date and time of the transaction and additional cardholder information may be automatically recorded, but is not explicitly reported by the merchant 16 processing the transaction. A level 2 transaction includes the same three data fields as the level 1 transaction, and in addition, the following data fields may be generated automatically by advanced point of payment systems for level 2 transactions: sales tax amount, customer reference number/code, merchant zip/postal code tax id, merchant minority code, merchant state code.

In one embodiment, the card payment processor 12 further includes system 200 for transaction laundering detection. The system 200 for transaction laundering detection identifies transaction laundering merchants using models trained on attributes of transaction laundering merchants identified from voluminous transaction records. In an embodiment, the system 200 generates ten "bootstrap" samples, which includes randomly selected (with replacement) merchant transaction laundering records that are identified from the payment transaction records 24. In other embodiments, other numbers of bootstrap samples can be generated. In an embodiment, more than 800 merchant transaction laundering records from the payment transaction records 24 can be identified. In other embodiments, other numbers of records from the payment transaction records 24 can be identified.

Figure 1B:
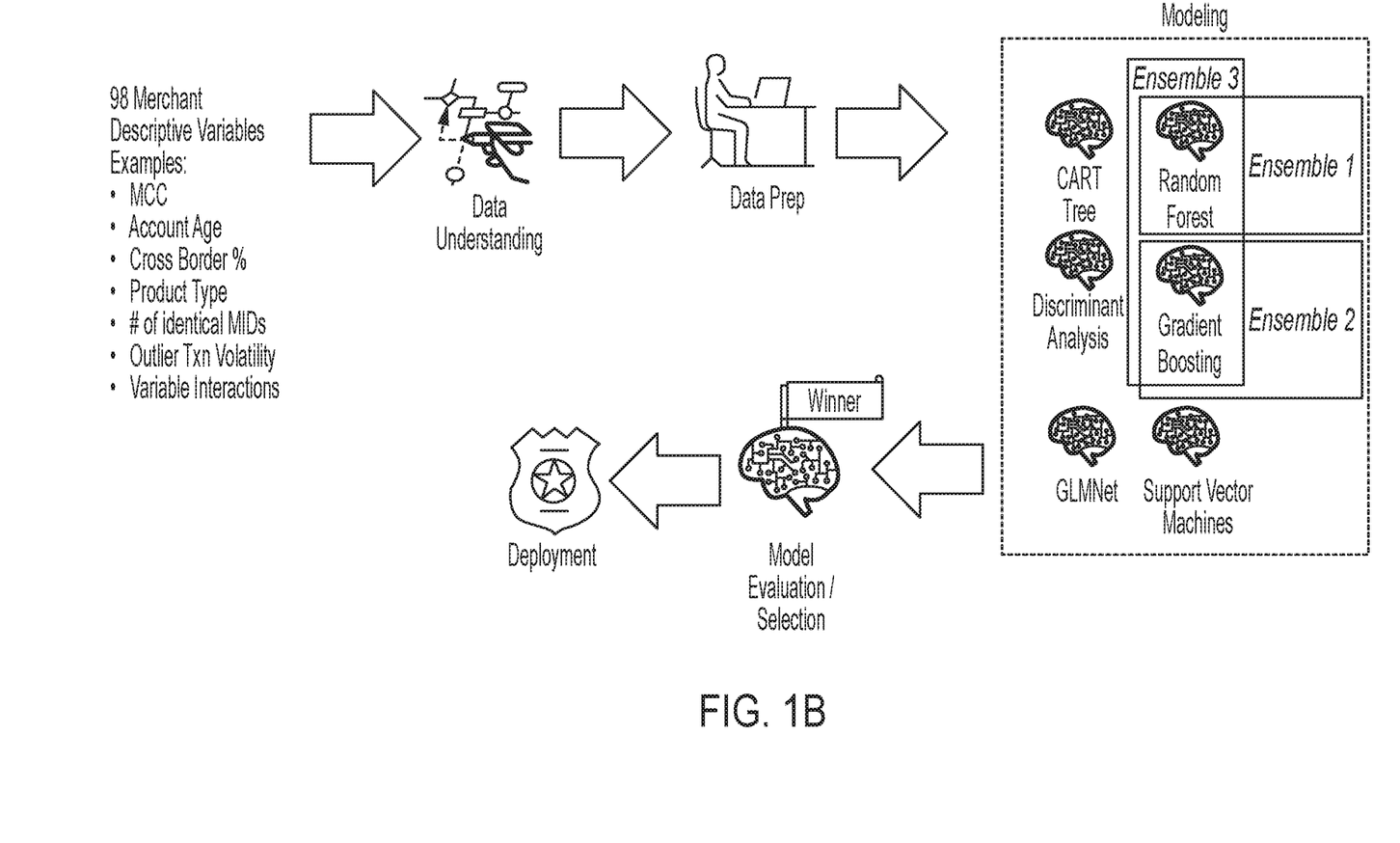
FIG. 1B illustrates the manner in which models are evaluated and selected according to an embodiment.

In an embodiment, multiple pluralities of models of different type can be used to identify transaction laundering of the merchants 16. For example, in an embodiment, a plurality of gradient boosting models (GBM) and a plurality of random forest models (RFM) can be used to identify transaction laundering merchants. In other embodiments, other types of models can be used to identify transaction laundering merchants. FIG. 1B shows phases of the model selection process which include but are not limited to: merchant descriptive variables identification, data understanding, data preparation, modeling, model evaluation and selection, and deployment. In an embodiment, the models, e.g., deep neural network (DNN) classifiers, can use 98 variables' characteristics associated with transaction laundering identified in transaction records to identify transaction laundering merchants. In other embodiments, other numbers of variables associated with transaction laundering identified in transaction records can be used to identify transaction laundering merchants. In an embodiment, merchant descriptive variables can include but are not limited to merchant category codes (MCC), account age, cross-border percent, product type, number of identical merchant identifications (MIDs), outlier transaction volatility and variable interactions.

System 200 identifies merchants that are likely to be involved in transaction laundering by analyzing merchant accounts and identifying merchants with anomalous payment system attributes. In an embodiment, the identifications can be based on years of records of transaction laundering merchants identified in the payment ecosystem. In an embodiment, these records are utilized to identify the unique characteristics of transaction laundering merchants. In addition, in an embodiment, statistical approaches can be used to detect and identify these merchants. In an embodiment, the herein described variables can be used to detect irregularities in payment systems in order to proactively identify at-risk merchants and their acquirers.

Operation

Figure 1C:
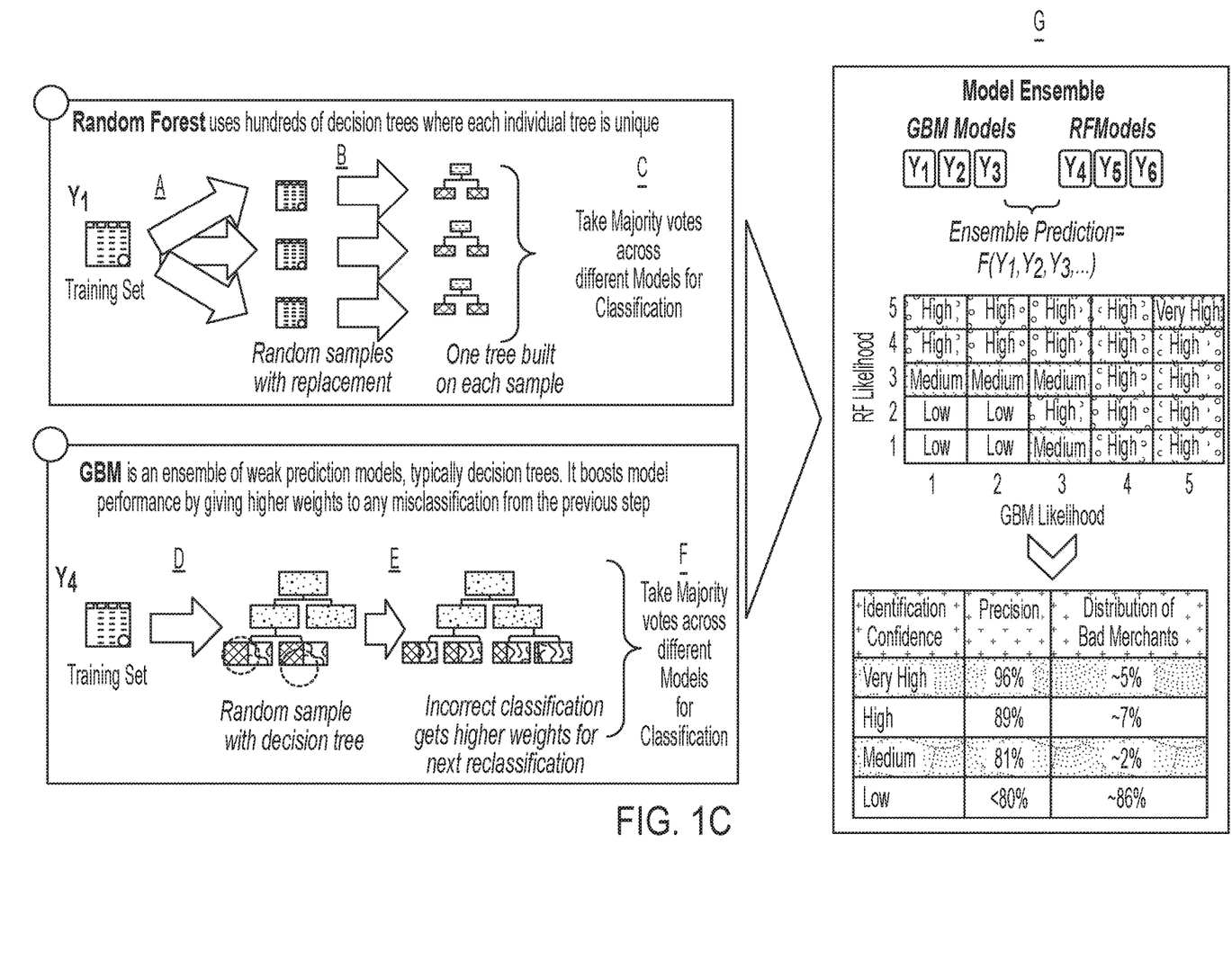
FIG. 1C illustrates operations performed by a system for detecting transaction laundering according to an embodiment.

FIG. 1C illustrates example operations A-F performed by system 200 for detecting transaction laundering. In an embodiment, it should be appreciated that the operations A-C and D-F described with reference to FIG. 1C below successively, and as being performed respectively by a first model group and a second model group, can be performed in parallel.

First Modeling Group

Referring to FIG. 1C, at operation A, from an initial set of training data a plurality of random samples with replacement are generated. In an embodiment, the training data includes data that includes a plurality of descriptive variables associated with transaction laundering for transaction laundering detection. In an embodiment, the random samples can be generated by augmenting an initial sample by bootstrapping.

Figure 1D:
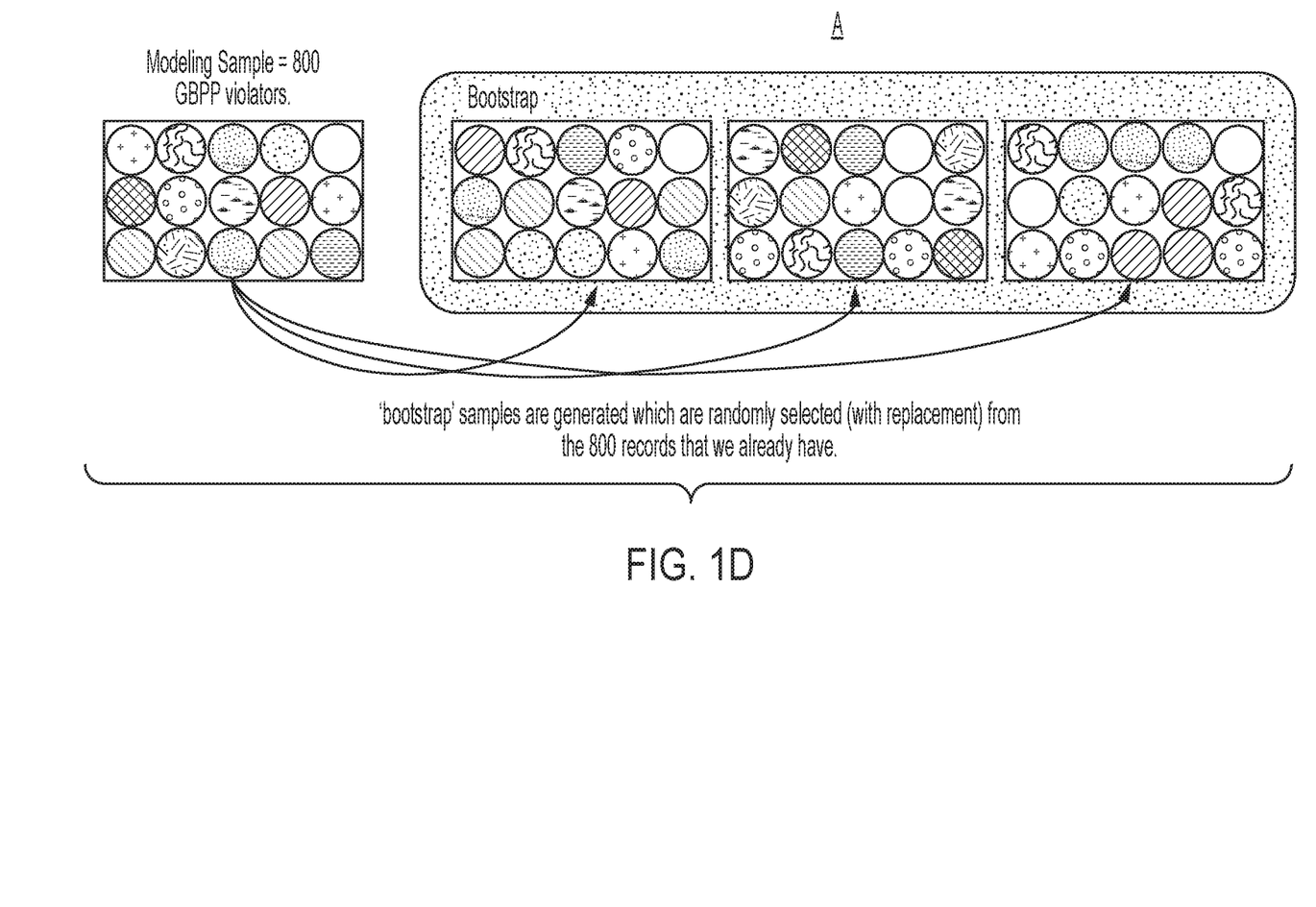
FIG. 1D shows the manner in which samples are bootstrapped from training data according to an embodiment.

In particular, the data can be generated from randomly selecting, with replacement, data samples from the training data. For example, as shown in FIG. 1D, from a modeling sample of 800 merchant violator records (e.g., that may be based on information gathered from payment transaction records 24 in FIG. 1A), bootstrap samples can be generated by randomly selecting samples, with replacement. In other embodiments, other numbers of initial records can be used. Referring again to FIG. 1C a plurality of samples are generated from the initial records and a decision tree is built on each sample.

At operation B, a first plurality of different models are trained to identify transaction laundering merchants based on the random samples generated from each of the training data samples from FIG. 1D. In an embodiment, the first plurality of different models can be random forest models. In other embodiments, the first plurality of different models can be other type models. Based on the training, a transaction laundering classification for a merchant of interest is generated by each of the first plurality of models.

At operation C, a first model group classification for a merchant of interest is generated based on a majority vote on the transaction laundering classifications that are generated by the first plurality of models.

Second Model Group

At operation D, each training data sample from FIG. 1D is accessed and decision trees are built on a random sample for each of a second plurality of models. In an embodiment, the second plurality of models can be gradient boosting models. In other embodiments, the second plurality of models can be other type models.

At operation E, as part of the training of the decision trees, an incorrect classification gets higher weights for a next reclassification. Based on the training, a transaction laundering classification for a merchant of interest is generated by each of the second plurality of models.

At operation F, a second model group classification is generated for a merchant of interest based on a majority vote on the transaction laundering classifications generated by the second plurality of models.

At operation G, a likelihood that the merchant is a transaction launderer based on an intersection of likelihoods indicated by the first model group classification and the second model group classification, is determined. Referring to FIG. 1C, a table of likelihoods indicated by the first model group versus the second model group according to an embodiment is shown. The classification likelihood is indicated by the intersection of the likelihoods indicated by the first model group (e.g., the first plurality of models) and the second model group (e.g., the second plurality of models). In an embodiment, the classification likelihoods for the first model group and the second model group can include low, medium, high and very high likelihoods. In an embodiment, each of these likelihoods correspond to an identification confidence that has an associated precision and distribution of bad merchants (see bottom table). In other embodiments, other manner of determining likelihoods based on the likelihoods indicated by the first model group and the second model group can be used.

In an embodiment, as regards the first and second model groups, the first plurality of models can include 10 models and the second plurality of models can include 10 models. In other embodiments, the first plurality of models and the second plurality of models can include other numbers of models. In an embodiment, sample size, number of models and tree depth can vary. In an embodiment, the training data is updated as newly obtained information related to transaction laundering merchants is acquired.

Components of System for Detecting Transaction Laundering

Figure 2:
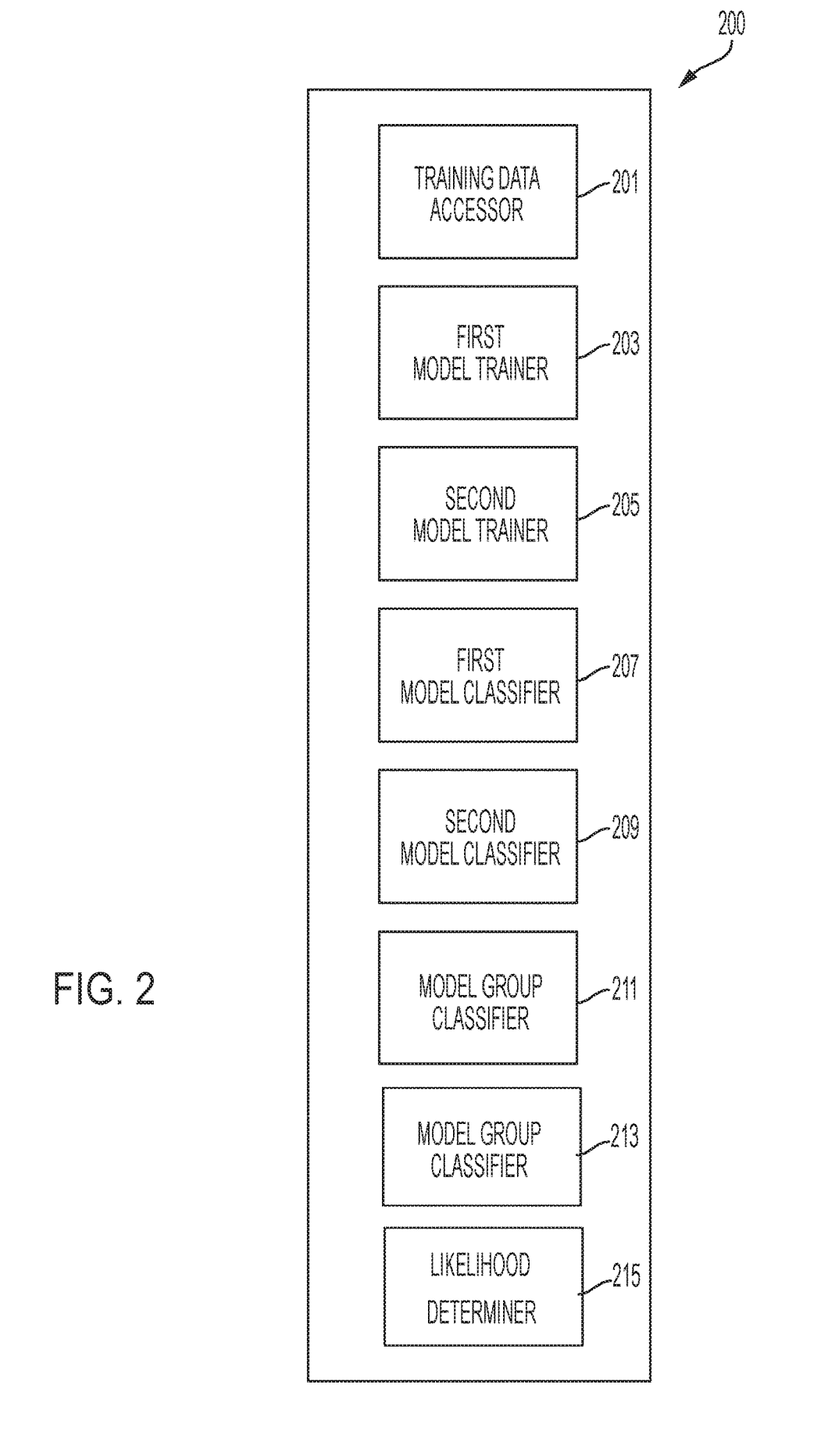
FIG. 2 shows a system for detecting transaction laundering according to an embodiment.

FIG. 2 shows components of a system 200 for detecting transaction laundering according to an embodiment. System 200 includes training data accessor 201, first model trainer 203, second model trainer 205, first model classifier 207, second model classifier 209, model group classifier 211, model group classifier 213, and likelihood determiner 215.

Training data accessor 201 accesses an initial set of training data and a plurality of random samples with replacement are generated. In an embodiment, the training data includes data that includes a plurality of descriptive variables associated with transaction laundering for transaction laundering detection. In an embodiment, the random samples can be formed by augmenting an initial sample by bootstrapping.

First model trainer 203 trains a first plurality of different models to identify transaction laundering merchants based on random samples from every training data sample generated by training data accessor 201. In an embodiment, each model of the plurality of models includes a tree that is built on a unique sample. Based on the training, a transaction laundering classification for a merchant of interest can be generated from each of the first plurality of models.

Second Model trainer 205 trains a second plurality of different models to identify transaction laundering merchants based on the training data. In an embodiment, a decision tree is built on random samples generated by training data accessor 201 for each of the second plurality of models. As part of the training of the decision trees, an incorrect classification gets higher weights for a next reclassification. Based on the training, a transaction laundering classification for a merchant of interest can be generated from each of the second plurality of models.

First Model classifier 207 generates a transaction laundering classification for a merchant from each of the first plurality of models. The transaction laundering classifications that are provided by the first plurality of models can be used as the basis for a majority vote.

Second Model classifier 209 generates a transaction laundering classification for a merchant from each of the second plurality of models. The transaction laundering classifications that are provided by the second plurality of models can be used as the basis for a majority vote.

Model group classifier 211 generates a first model group classification for a merchant of interest based on a majority vote on the transaction laundering classifications generated by the first plurality of models. In an embodiment, the outcome of the vote determines a classification likelihood.

Model group classifier 213 generates a second model group classification for a merchant of interest based on a majority vote on the transaction laundering classifications generated by the second plurality of models. In an embodiment, the outcome of the vote determines a classification likelihood.

Likelihood determiner 215 determines a likelihood that the merchant is a transaction launderer based on an intersection of likelihoods indicated by the first model group classification and the second model group classification.

FIG. 2 illustrates an example manner of implementing the system 200 of FIG. 1A. In an embodiment, one or more of the elements, processes, components and/or devices of the system 200 may be integrated, separated, re-arranged, omitted, eliminated and/or implemented in other manners. In an embodiment, the components of system 200 can be implemented using hardware, software, firmware and/or any combination thereof. In particular, components of system 200 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In an embodiment, as regards software and/or firmware implementation of the system 200, at least one of the components of such is/are hereby expressly defined to include a non-transitory computer readable storage device or storage disk such as a memory, a digital versatile disk (DVD), a compact disk (CD), a Blu-ray disk, etc. including the software and/or firmware. It should be appreciated that, the example system 200 can include one or more elements, processes and/or devices in addition to, or instead of, those illustrated in FIG. 2, and/or may include more than one of any or all of the illustrated elements, processes and devices.

Figure 3:
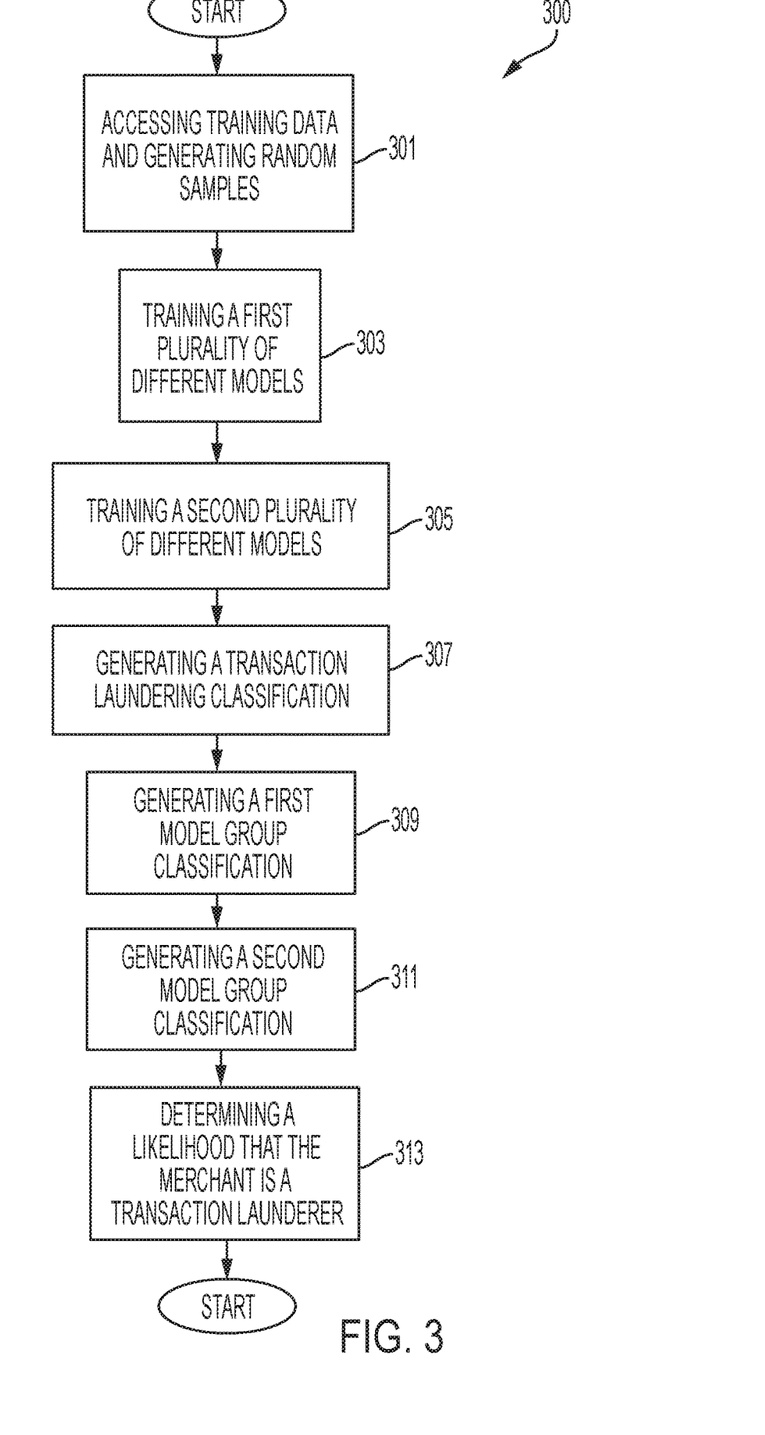
FIG. 3 shows a flowchart of a method for detecting transaction laundering according to an embodiment.

FIG. 3 is a flowchart 300 of a method for detecting transaction laundering according to an embodiment. Referring to FIG. 3, the method includes at 301, accessing training data samples that includes a plurality of transaction laundering associated features and generating random samples. At 303, training a first plurality of different models to identify transaction laundering merchants based on random samples generated from each training data sample generated at 301. At 305, training a second plurality of different models to identify the transaction laundering merchants based on each training data sample generated at 301. At 307, generating a transaction laundering classification for a merchant from each of the first plurality of models and each of the second plurality of models. At 309, generating a first model group classification based on a first majority vote on transaction laundering classifications from the first plurality of models. At 311, generating a second model group classification based on a second majority vote on transaction laundering classifications from the second plurality of models. At 313, determining a likelihood that the merchant is a transaction launderer based on an intersection of likelihoods of the first model group classification and the second model group classification.

In an embodiment, the method further comprising blacklisting the merchant pending review, if the likelihood is greater than a predetermined threshold. In an embodiment, if the likelihood is greater than a predetermined amount, it can lead to a suspension during investigation and if confirmed termination. If the investigation is inconclusive the merchant can be monitored persistently. In an embodiment, the method further comprising using statistical analysis in conjunction with the intersection of likelihoods to determine a level of identification confidence. In an embodiment, a decision tree is associated with each of the random samples associated with the first plurality of models. In an embodiment, for the second plurality of models, an incorrect classification gets higher weights for a next reclassification. In an embodiment, the transaction laundering features are associated with past transaction laundering merchants. In an embodiment, the transaction laundering features are identified from a plurality of years of transactions.

In an embodiment, the operations of the flowchart 300 can correspond to machine readable instructions of a program that can be executed by a processor of a computer system 200 such as is discussed with regard to FIG. 4 below. In some embodiments, the program and/or portions or parts thereof can be executed by a device other than a processor. The program can be stored on a non-transitory machine or computer readable storage medium such as a hard drive, a digital versatile disk (DVD), a read-only memory, a compact disk, a floppy disk, a Blu-ray disk, a cache, a random-access memory or other storage device. As used herein, the term non-transitory computer readable medium is intended to refer to computer readable storage devices and/or storage disks and to exclude propagating signals and to exclude transmission media. In some embodiments, the program can be embodied in firmware or dedicated hardware. In an embodiment, one or more of the operations of the flowchart can be performed without executing software or firmware. For example, one or more of the blocks may be implemented by one or more hardware circuits such as a Field Programmable Gate Array (FPGA), an Application Specific Integrated circuit (ASIC), a discrete and/or integrated analog and/or digital circuit, a comparator, an operational-amplifier (op-amp), a logic circuit, etc. It should be noted that the order of execution of the blocks of the flowchart of FIG. 3 may be changed. In addition, one or more of the blocks of the flowchart can be eliminated or added.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device. Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Figure 4:
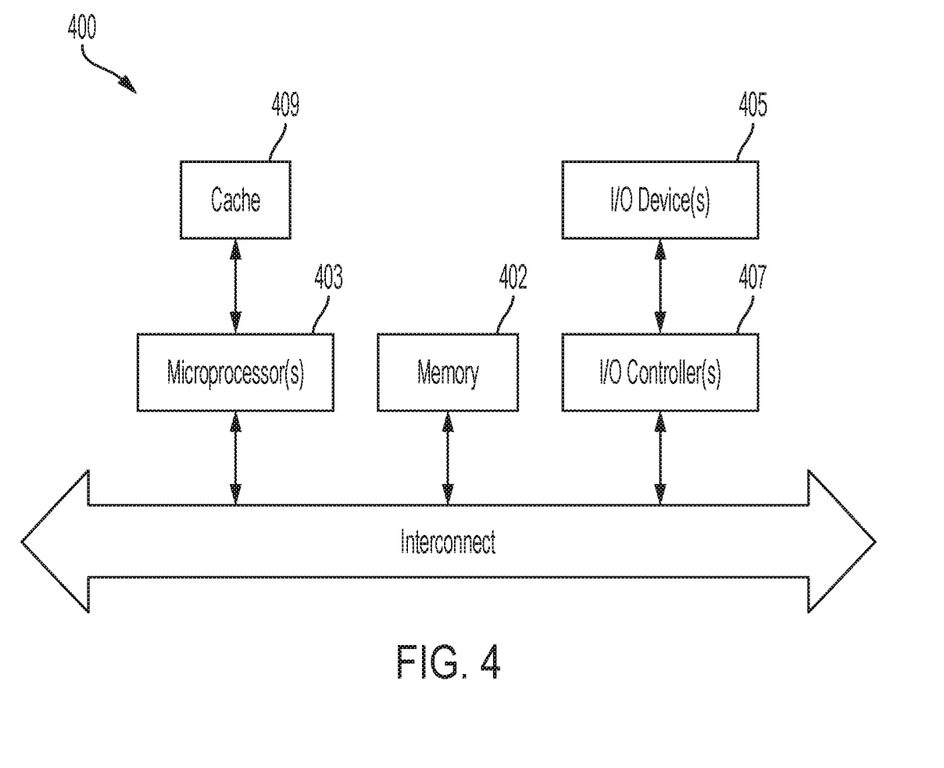
FIG. 4 shows a schematic of a computer system according to an embodiment.

FIG. 4 shows a computer system 400 according to an embodiment. The computer system 400 can include a microprocessor(s) 403 and memory 402. In an embodiment, the microprocessor(s) 403 and memory 402 can be connected by an interconnect 401 (e.g., bus and system core logic). In addition, the microprocessor 403 can be coupled to cache memory 409. In an embodiment, the interconnect 401 can connect the microprocessor(s) 403 and the memory 402 to input/output (I/O) device(s) 405 via I/O controller(s) 407. I/O devices 405 can include a display device and/or peripheral devices, such as mice, keyboards, modems, network interfaces, printers, scanners, video cameras and other devices known in the art. In an embodiment, (e.g., when the data processing system is a server system) some of the I/O devices 405, such as printers, scanners, mice, and/or keyboards, can be optional.

In an embodiment, the interconnect 401 can include one or more buses connected to one another through various bridges, controllers and/or adapters. In one embodiment, the I/O controllers 407 can include a USB (Universal Serial Bus) adapter for controlling USB peripherals, and/or an IEEE-1394 bus adapter for controlling IEEE-1394 peripherals.

In an embodiment, the memory 402 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of an application claiming priority to this provisional application to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method for identifying merchants likely to be involved in transaction laundering, comprising:
identifying merchant transaction laundering records from payment transaction records and generating training data samples from randomly selected ones of the merchant transaction laundering records, the merchant transaction laundering records including a plurality of variables associated with transaction laundering;
training a first plurality of different models to identify transaction laundering merchants based on training data samples;
training a second plurality of different models to identify the transaction laundering merchants based on the training data samples;
inputting payment transaction records for a merchant of interest to both the first plurality of models and the second plurality of models, the second plurality of models being different from the first plurality of models;
outputting, by the first plurality of models, a first plurality of transaction laundering classifications for the payment transaction records, and outputting, by the second plurality of models, a second plurality of transaction laundering classifications for individual payment transaction records;
generating a table of classification likelihoods indicated by the first plurality of transaction laundering classifications and the second plurality of transaction laundering classifications, and determining a classification likelihood for the individual payment transaction records based on an intersection of matching classification likelihoods for the individual payment transaction records generated by the first plurality of models and the second plurality of models;
using the matching classification likelihoods in conjunction with statistical analysis to determine a level of identification confidence that the merchant is a transaction launderer when the level of identification confidence is greater than a predetermined threshold.

2. The method of claim 1, further comprising blacklisting the merchant of interest when the classification likelihood is greater than the predetermined threshold.

3. The method of claim 1, wherein a decision tree is associated with each of the first plurality of transaction laundering classifications associated with the first plurality of models.

4. The method of claim 1, further comprising accessing the training data samples and training decision trees for the second plurality of models such that as part of the training off the second plurality of models, an incorrect classification generated by the decision trees receives a higher weights for a next reclassification.

5. The method of claim 1, wherein the plurality of variables associated with the transaction laundering are associated with past transaction laundering merchants.

6. The method of claim 1, wherein the a plurality of variables associated with the transaction laundering are identified from a plurality of years of transactions.

7. A system that identifies merchants likely to be involved in transaction laundering, comprising:
one or more processing components;
one or more data storage components, at least one of the one or more data storage components including instructions that when executed cause at least one of the one or more processing components to:
identify merchant transaction laundering records from payment transaction records and generate training data samples from randomly selected ones of the merchant transaction laundering records, the merchant transaction laundering records including a plurality of variables associated with transaction laundering;
train a first plurality of different models to identify transaction laundering merchants based on the training data samples;
train a second plurality of different models to identify the transaction laundering merchants based on the training data samples;
input payment transaction records for a merchant of interest to both the first plurality of models and the second plurality of models, the second plurality of models being different from the first plurality of models;
output, by the first plurality of models, a first plurality of transaction laundering classifications for the payment transaction records, and output, by the second plurality of models, a second plurality of transaction laundering classifications for individual payment transaction records;
generate a table of classification likelihoods indicated by the first plurality of transaction laundering classifications and the second plurality of transaction laundering classifications, and determine a classification likelihood for the individual payment transaction records based on an intersection of matching classification likelihoods for the individual payment transaction records generated by the first plurality of models and the second plurality of models; and
using the matching classification likelihoods in conjunction with statistical analysis to determine a level of identification confidence that the merchant is a transaction launderer when the level of identification confidence is greater than a predetermined threshold.

8. The system of claim 7, wherein the instructions further cause the one or more processing components to: blacklist the merchant when the classification likelihood is greater than a predetermined threshold.

9. The system of claim 7, wherein a decision tree is associated with each of the first plurality of transaction laundering classifications associated with the first plurality of models.

10. The system of claim 7, wherein the instructions further cause the one or more processing components to: access the training data samples and training decision trees for the second plurality of models such that as part of the training of the second plurality of models, an incorrect classification generated by the decision trees receives a higher weights for a next reclassification.

11. The system of claim 7, wherein the a plurality of variables associated with the transaction laundering are associated with past transaction laundering merchants.

12. The system of claim 8, wherein the plurality of variables associated with the transaction laundering are identified from a plurality of years of transactions.

13. A non-transitory computer-readable medium comprising computer readable instructions which when executed, cause a processor to identifying merchants likely to be involved in transaction laundering by:

identifying merchant transaction laundering records from payment transaction records and generating training data samples from randomly selected ones of the merchant transaction laundering records, the merchant transaction laundering records including a plurality of variables associated with transaction laundering;

training a first plurality of different models to identify transaction laundering merchants based on the training data samples;

training a second plurality of different models to identify the transaction laundering merchants based on the training data samples;

inputting payment transaction records for a merchant of interest to both the first plurality of models of the second plurality of models, the second plurality of models being different from the first plurality of models;

outputting, by the first plurality of models, a first plurality of transaction laundering classifications for the payment transaction records, and outputting, by the second plurality of models, a second plurality of transaction laundering classifications for individual payment transaction records;

generating a table of classification likelihoods indicated by the first plurality of transaction laundering classifications and the second plurality of transaction laundering classifications, and determining a classification likelihood for the individual payment transaction records based on an intersection of matching classification likelihoods generated by the first plurality of models and the second plurality of models; and using the matching classification likelihoods in conjunction with statistical analysis to determine a level of identification confidence that the merchant is a transaction launderer when the level of identification confidence is greater than a predetermined threshold.

14. The medium of claim 13, further comprising blacklisting the merchant of interest when the classification likelihood is greater than the predetermined threshold.

15. The medium of claim 13, wherein a decision tree is associated with each of the first plurality of transaction laundering classifications associated with the first plurality of models.

16. The medium of claim 13, further comprising accessing the training data samples and training decision trees for the second plurality of models such that as part of the training of the second plurality of models an incorrect classification generated by the decision trees receives a higher weights for a next reclassification.

17. The medium of claim 13, wherein the plurality of variables associated with the transaction laundering are associated with past transaction laundering merchants.

* * * * *